(12) United States Patent
Ross

(10) Patent No.: X8643
(45) Date of Patent: Feb. 6, 1835

(54) HULLING CLOVER SEED, & CLEANING

(76) Inventor: Joseph Ross

Joseph Ross

Letters Patent.

The Schedule referred to in these Letters Patent, and making a part of the same, containing a description in the words of the said Joseph Ross, himself, of his improvement in a Machine for the purpose of rubbing out and cleaning Clover & other seeds.

To all whom it may concern. Be it known, that I, Joseph Ross, of Boundbrook, in the County of Somerset, and State of New Jersey, have invented a new & improved Machine, for the purpose of rubbing out, and cleaning Clover and other seeds. and that the following is a full & exact description thereof. I construct a frame to sustain a horizontal cylinder, and other parts of the apparatus, to be presently described. The cylinder may vary in length & diameter, according to the power by which it is to be driven. The cylinder is to be set with teeth of two kinds, one set of teeth may be from one fourth to half an inch in length. These form circles round the cylinder, the circles being an inch, more or less, apart. Between these rows of longer wires or sprigs are driven, which should not stand out more than one sixteenth of an inch, their office being to rub the seed from the husk; a similar effect may be produced by covering the cylinder with punched sheet iron, or in other well known ways. I use a concave which surrounds the cylinder for about three quarters of its circumference the part directly under the cylinder extending about one quarter of its circumference, may be of punched sheet iron, or of wove wire with meshes of such size as will allow the seeds, but not the chaff to pass through. The remaining part of the concave extending up to the apex of the cylinder, may be left smooth. The distance between the cylinder and the concave must be sufficient for the passage of the longer teeth. The seed to be hulled is put into into a hopper above the cylinder, the opening through the bottom thereof extending the whole length of the cylinder. In front of the cylinder I employ rubbers which are made by taking wide strips of sole leather, the length of the cylinder, there being three, or four, or more, such strips; these I confine between pieces of thin board, one piece being plaised between each strip. The edge of the leather, where it touches the cylinder, projects beyond the thin boards, so as to give it the necessary play, each piece of leather is so notched as to allow the longer teeth to pass. The leather rubber, thus formed slides in against the cylinder, and is therefore capable of being adjusted so as to press against it with greater or less force. When the seed has passed the leather rubbers, the greater part of it falls through an opening, on the floor, whilst the chaff and the remaining seed, is, by the action of the longer teeth, carried immediately over the perforated iron, or the meshes of wire work of which the lower part of the concave is formed. At the point where the smooth part of the concave commences, an opening may be made by lowering the bottom part of the concave, which is hinged in front, for that purpose. Stones or other hard substances may thus be readily removed. a strip of leather is fixed along the edge of this opening, which extends to the cylinder, serving to check the too free passage of the seed round with the chaff, whilst by its elasticity, it will allow the long teeth to carry the chaff beyond it. The back edge of the hopper has also a similar piece of leather upon it which extends to the cylinder, and arrests the chaff, causing it to be blown out through an opening immediately behind the hopper, whilst that which contains seed, will, from its greater weight, be retained and pass the leather to be again rubbed. What I claim as new in the foregoing machine, is the combination of long and short teeth in the cylinder, operating in the manner, and for the purposes set forth. I also claim the leather rubber constructed & acting in the manner described. Not intending by these claims to limit myself to the precise arrangement arrangement set forth, but to vary the same in any way, whilst I
produce the same effects by Machinery operating substantially
upon the same principle. In testimony that the foregoing is a true
Specification of my invention, I have hereunto subscribed my name
before two witnesses, at the City of Washington, on this twenty third
day of January, in the year one thousand eight hundred and
thirty five.

Exd.
Witnesses Joseph Ross. WJC.

Jos Andrews
Charles C. Russell (816 words)

(Granted February 6th 1835.)

J. Ross.
Clover Huller.
No. Patented Feb. 6. 1835.
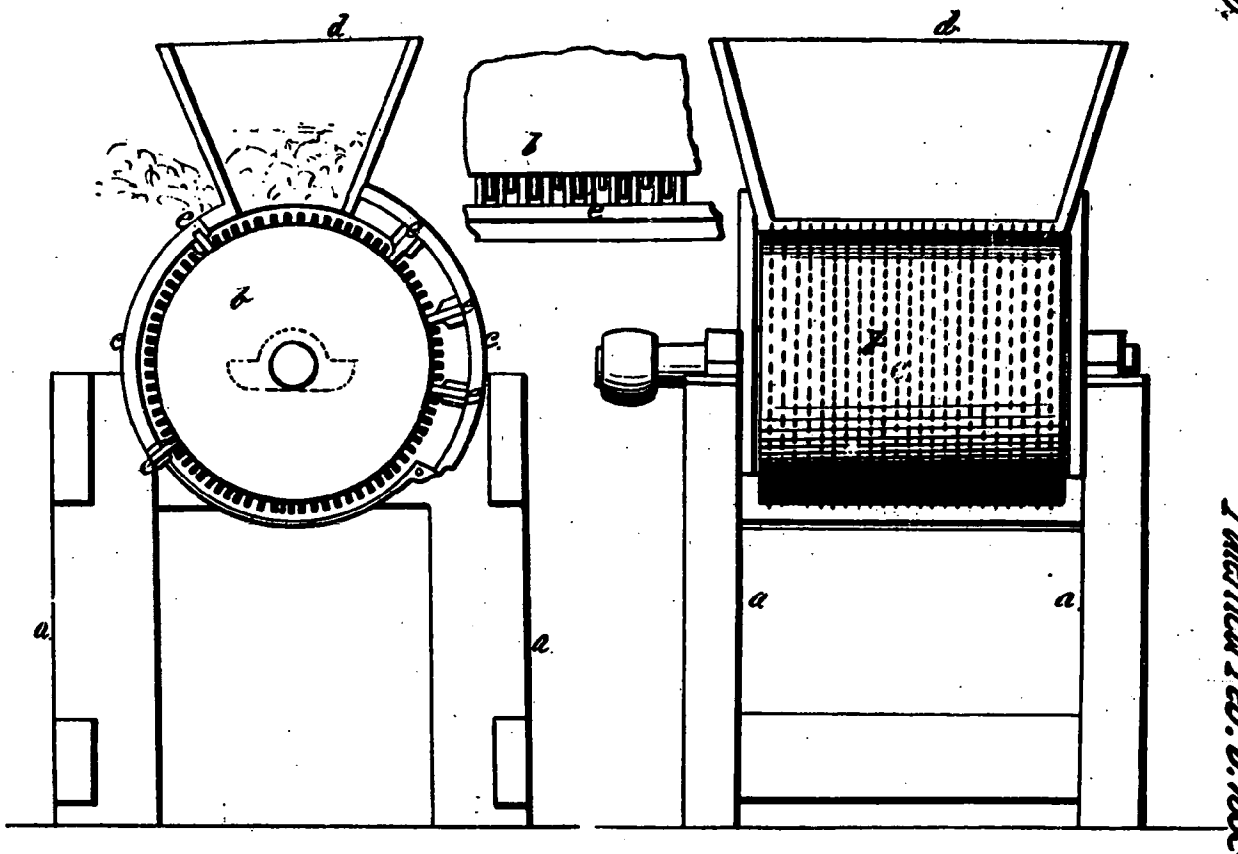
N. PETERS, PHOTO-LITHOGRAPHER, WASHINGTON, D.C.